United States Patent [19]
Dudley et al.

[11] Patent Number: 5,582,488
[45] Date of Patent: *Dec. 10, 1996

[54] RATCHET LINK

[75] Inventors: James P. Dudley, Sacramento; Kyle D. Fields, El Dorado Hills; Timothy J. Landis, Loomis, all of Calif.

[73] Assignee: OP-D-OP, Inc., Roseville, Calif.

[ * ] Notice: The term of this patent shall not extend beyond the expiration date of Pat. No. 5,503,497.

[21] Appl. No.: 589,887

[22] Filed: Jan. 23, 1996

Related U.S. Application Data

[63] Continuation-in-part of Ser. No. 308,608, Sep. 19, 1994, Pat. No. 5,503,497.

[51] Int. Cl.⁶ .................................................. A63H 33/08
[52] U.S. Cl. ..................... 403/103; 403/354; 403/361; 403/364; 446/104; 446/111; 446/120; 446/125
[58] Field of Search .................................. 446/125, 120, 446/104, 102, 111; 403/103, 354, 361, 364

[56] References Cited

U.S. PATENT DOCUMENTS

| | | | |
|---|---|---|---|
| 1,678,709 | 7/1928 | Schurmann . | |
| 2,388,297 | 11/1945 | Slaughter . | |
| 2,990,640 | 7/1961 | Burnbaum | 446/120 X |
| 3,000,049 | 9/1961 | Terry, Jr. . | |
| 3,118,167 | 1/1964 | Morris et al. . | |
| 3,477,167 | 11/1969 | Ach | 446/120 X |
| 3,550,311 | 12/1970 | Fouquart | 446/120 X |
| 4,071,244 | 1/1978 | Richards | 446/120 X |
| 4,352,255 | 10/1982 | Warehime | 446/102 X |
| 4,506,408 | 3/1985 | Brown . | |
| 4,548,590 | 10/1985 | Green | 446/120 |
| 4,617,001 | 10/1986 | Parein | 446/102 |
| 4,738,648 | 4/1988 | Berndt | 446/120 |
| 5,049,104 | 9/1991 | Olsen | 446/104 |
| 5,172,534 | 12/1992 | Milner et al. | 446/104 X |
| 5,209,693 | 5/1993 | Lyman | 446/104 |
| 5,427,559 | 6/1995 | Glickman et al. | 446/104 X |
| 5,482,491 | 1/1996 | Kichijyo | 446/120 X |
| 5,486,127 | 1/1996 | Wolfe | 446/120 |
| 5,503,497 | 4/1996 | Dudley et al. | 403/103 |

Primary Examiner—Terry Lee Melius
Assistant Examiner—Christopher J. Novosad
Attorney, Agent, or Firm—John P. O'Banion

[57] ABSTRACT

A ratchet link having a cylindrically-shaped tongue at one end, and an offset C-shaped socket at the other end defined by a pair of opposing, spaced-apart, resilient arcuate prongs which extend outward from the device away from the tongue end. Spaced-apart teeth are provided along the inside surface of the socket and along the outside surface of the tongue. When the tongue of one link is placed into the socket of another link, the teeth intermesh wherein the teeth in the tongue fit into the interdental notches between the teeth in the socket, and the teeth in the socket fit into the interdental notches between the teeth in the tongue. The tongue and socket pivot in discrete positions, while lateral movement is prevented by the engagement of a ring on the tongue that mates with a slot on the socket.

23 Claims, 7 Drawing Sheets

FIG. — 5

RATCHET LINK

CROSS-REFERENCE TO RELATED APPLICATIONS

This application is a continuation in part of application Ser. No. 08/308,608 filed on Sep. 19, 1994, now U.S. Pat. No. 5,503,497.

BACKGROUND OF THE INVENTION

1. Field of the Invention

This invention pertains to coupling devices generally, and more particularly to a chainable link which, when used in an articulating assembly, provides for pivotal ratcheting of adjacent links between various positions.

2. Description of the Background Art

Pivotal coupling devices are used in many applications where two or more components are joined together in a manner that allows movement of the components in relation to each other. A common pivotal coupling device is a hinge, and a number of hinge assemblies have been previously developed. Another common pivotal coupling device is a "link" found in the assembly known as a "chain". Such chains are used in many different types of machines to couple two or more sprockets for transmission of rotational motion. In such applications, the chain is held in a taught position under the urge of a spring or other force in order to control the degree of articulation at various points along the chain.

While a variety of coupling devices have been devised for use with doors, toy building blocks, and in connection with other applications, none of those devices provide for a chained assembly of articulating links capable of pivotal movement in finite, precise, clicking units, wherein lateral movement is also prevented. Therefore, there is a need for a chainable coupling device which can be quickly, easily, and accurately adjusted to a desired position, and which is capable of linking to other such devices to form extended assemblies with additional degrees of articulation. The present invention satisfies those needs, as well as others, and overcomes the deficiencies found in the coupling devices heretofore developed.

SUMMARY OF THE INVENTION

The present invention pertains generally to links which can be used to form ratcheting chained assemblies for coupling two objects in an articulating manner. By way of example, and not of limitation, a ratchet link in accordance with the present invention includes a cylindrically-shaped tongue at one end, a C-shaped socket at the other end, and a connecting bar which extends between the tongue and the socket, with the socket being angularly offset relative to the cylindrically-shaped tongue, preferably at a right angle. The socket is defined by a pair of opposing, spaced-apart, resilient arcuate prongs or forks which extend outward from the device away from the tongue end. The inside radius of the socket is substantially the same as the outside radius of the tongue, so that the tongue can be inserted into the socket of another link. The socket includes a narrow centrally positioned slot along its circumference, and the tongue includes a narrow centrally positioned ring extending outward along its circumference which is received by the slot when the tongue is inserted into the socket. A plurality of spaced apart teeth are provided along the inside surface of the socket and extend between a pair of parallel faces on the socket in a substantially perpendicular orientation to the plane of the faces. Similar teeth are located along the outside surface of the tongue, and extend between a pair of parallel faces on the tongue. In an alternative embodiment of the invention, the arcuate prongs of the socket are joined together to define a generally circular or ring-shaped socket.

When the tongue is placed into the socket of another link, the teeth intermesh wherein the teeth in the tongue fit into the interdental notches between the teeth in the socket, and the teeth in the socket fit into the interdental notches between the teeth in the tongue. Lateral movement is prevented by the engagement of the ring and the slot. Individual links are coupled by inserting the tongue of a first link into the socket of a second link with sufficient force to cause the arcuate prongs to spread apart, whereupon the tongue "pops" or snaps into the socket, the ring is inserted into the slot, and the teeth intermesh. At that point, the two devices are held in fixed relative position. Applying rotational force to each link in an opposite direction causes the arcuate prongs to spread slightly so as to overcome the intermeshing of the teeth and thereby allowing pivotal adjustment of the relative position or angle of the two links. When the rotational force is removed, the ratchet links retain the adjusted position. Each link can include a tongue at each end or a socket at each end. In addition, the link can be adapted for mounting to various objects.

An object of the invention is to provide a ratchet link that is quickly, easily, and accurately adjusted to precise incremental positions.

Another object of the invention is to provide a ratchet link which is capable of linking to other ratchet link devices to form extended ratcheting links with additional degrees of articulation.

Another object of the invention is to provide a ratchet link which can be used in association with equipment suspended from the head visors and head gear worn in the medical, dental, veterinary, and other professions.

Another object of the invention is to provide a ratchet link which can be used for articulating connection of toy building blocks.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DESCRIPTION OF THE PREFERRED EMBODIMENTS

Figure 1:
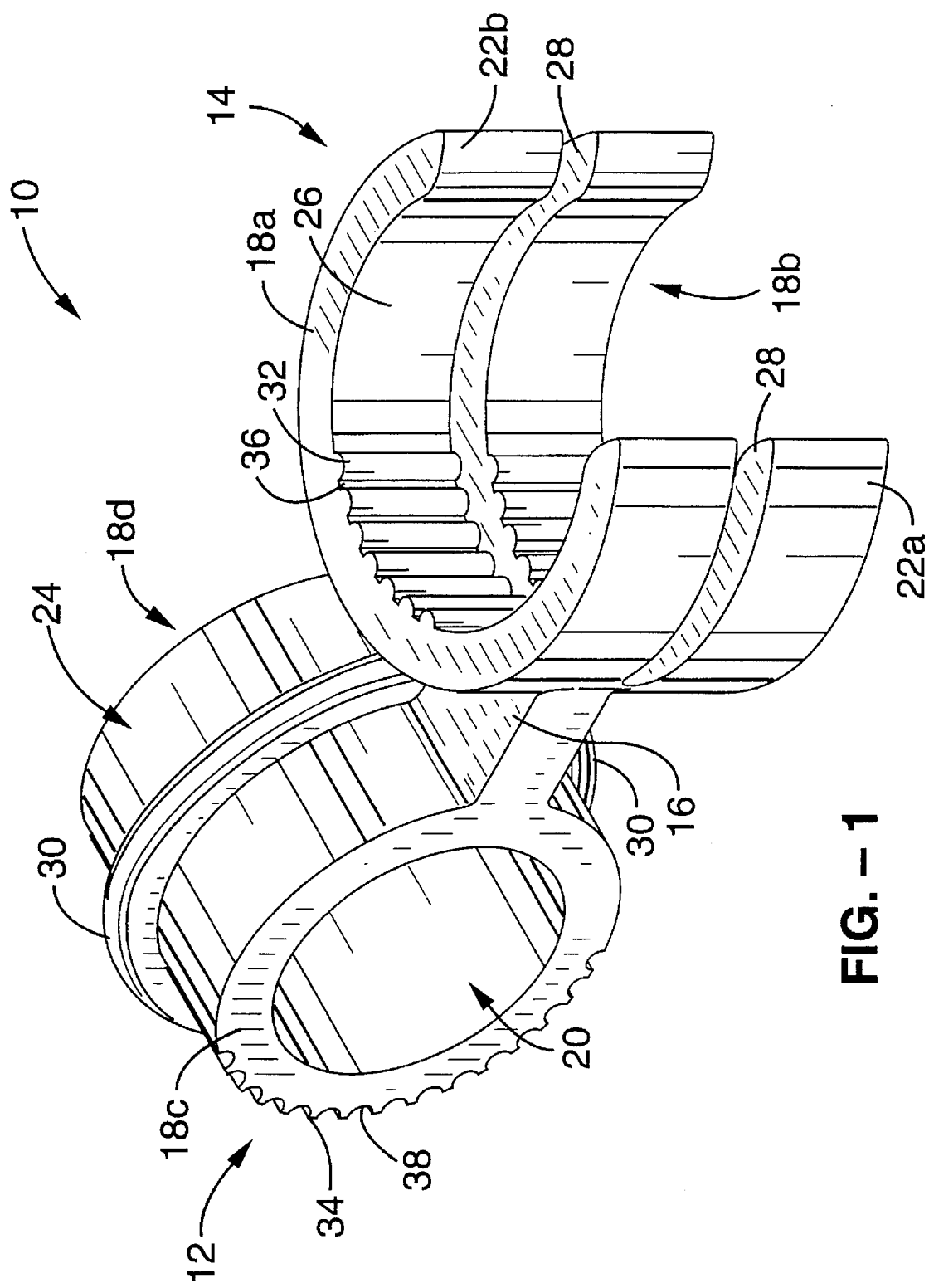
FIG. 1 is a perspective view of a ratchet link in accordance with the present invention showing a tongue positioned on one end and a socket positioned on the other end.

Referring more specifically to the drawings, for illustrative purposes the present invention is embodied in the apparatus generally shown in FIG. 1 through FIG. 12, where like reference numerals denote like pans. It will be appreciated that the apparatus may vary as to configuration and as to details of the parts without departing from the basic concepts as disclosed herein.

Figure 2:
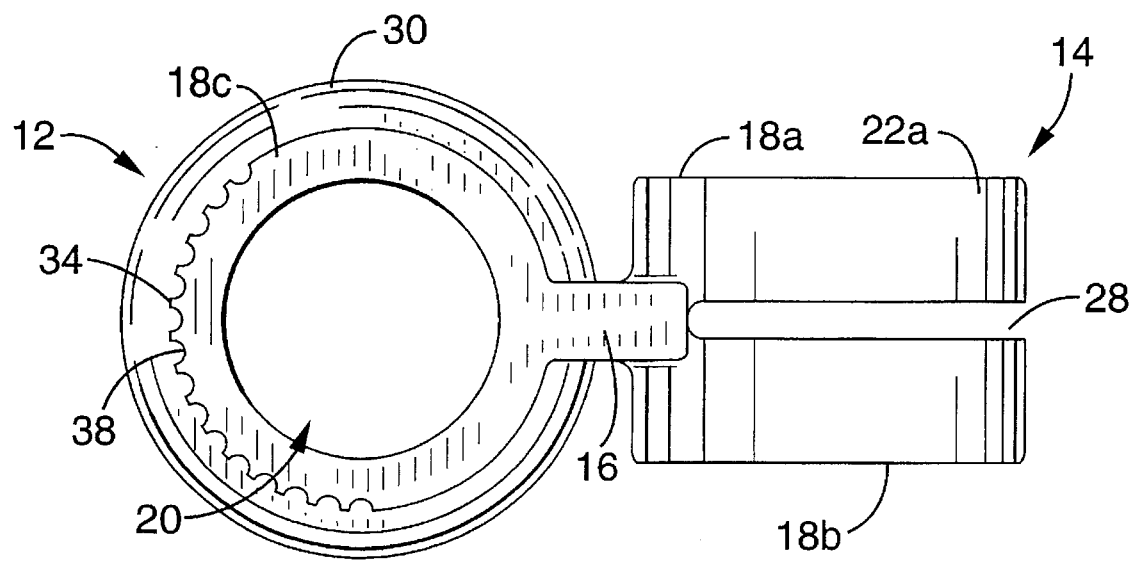
FIG. 2 is a side elevation view of the apparatus shown in FIG. 1.
Figure 3:
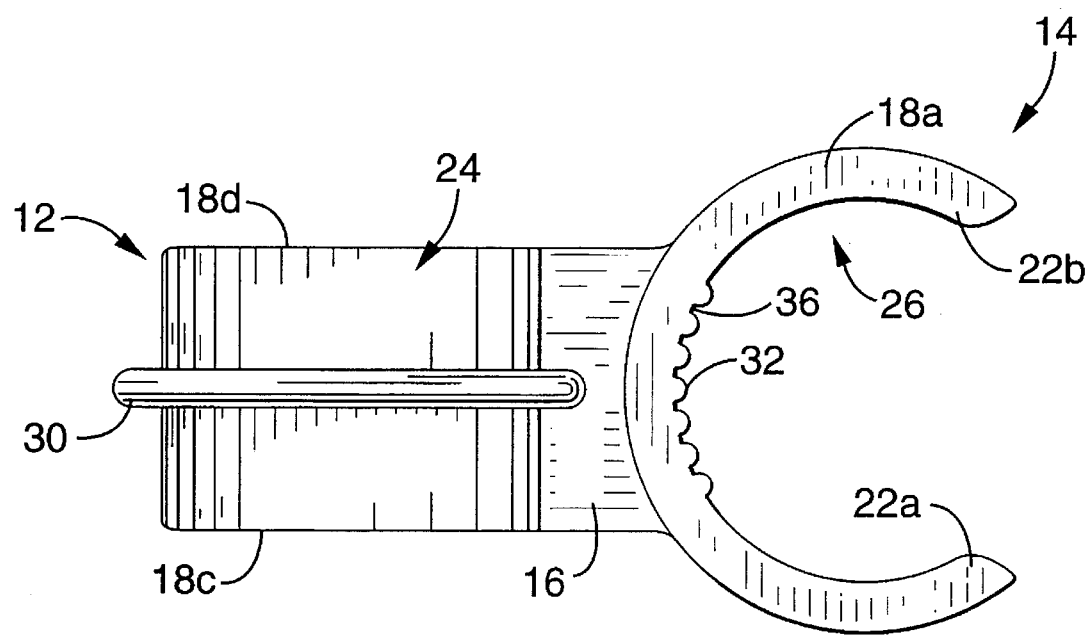
FIG. 3 is a top plan view of the apparatus shown in FIG. 1.

Referring first to FIG. 1 through FIG. 3, the preferred embodiment of a ratchet link 10 in accordance with the present invention is generally shown. As can be seen, the device includes a tongue 12, a socket 14, and a connecting bar or rod 16 extending between tongue 12 and socket 14. A first pair of generally planar surfaces 18a, 18b are included on socket 14, and a second pair of generally planar faces 18c, 18d are included on tongue 12. Tongue 12 and socket 14 generally are angularly offset relative to each other, preferably by an angle of approximately ninety degrees, such that faces 18a, 18b on socket 14 are generally perpendicular to faces 18c, 18d on tongue 12. However, it is contemplated that tongue 12 and socket 14 may be angularly offset anywhere within a range of from zero degrees, wherein tongue 12 and socket 14 are generally parallel, to ninety degrees at which point tongue 12 and socket 14 are offset from each other at a right angle as shown. Tonic 12 is a generally annular or cylindrical-shaped member as shown, and preferably includes a central opening 20 extending between faces 18c and 18d to reduce weight. Alternatively, tongue 12 could be a solid member. Socket 14 is a generally annular or C-shaped member having a pair of opposing, spaced-apart, resilient arcuate prongs 22a, 22b which extend outward away from tongue 12. Preferably, the inside radius of socket 14 is substantially equal to the outer radius of tongue 12 so that outer surface 24 of tongue 12 will contact inner surface 26 of socket 14 when tongue 12 is inserted into socket 14.

Socket 14 includes a narrow, centrally positioned arcuate slot 28 extending along its circumference, and tongue 12 includes a thin, centrally positioned ring 30 extending outward along its circumference which is received by slot 28 when tongue 12 is inserted into socket 14. A plurality of spaced-apart teeth 32 are provided along the inner surface 26 of socket 14 and extend between faces 18a, 18b of the device in a substantially perpendicular orientation to the plane of the faces 18c, 18d. Similar teeth 34 are located along the outside surface 24 of tongue 12, and extend between faces 18c, 18d. When tongue 12 is placed into socket 14, the teeth intermesh wherein the teeth 34 in tongue 12 fit into the interdental notches 36 between teeth 32 in socket 14, and the teeth 32 in socket 14 fit into the interdental notches 38 between the teeth 34 in tongue 12. Preferably, the teeth are in the form of serrations or ridges as shown, but other engagement means such as bumps or protrusions, in regular or random patterns, are also contemplated. In the preferred embodiment, the apparatus 10 is fabricated from a lightweight, resilient material such as molded plastic or non-brittle metal or metal alloy, so that prongs 22a, 22b will spread apart when force is applied and return to their original position when the force is removed.

Figure 4:
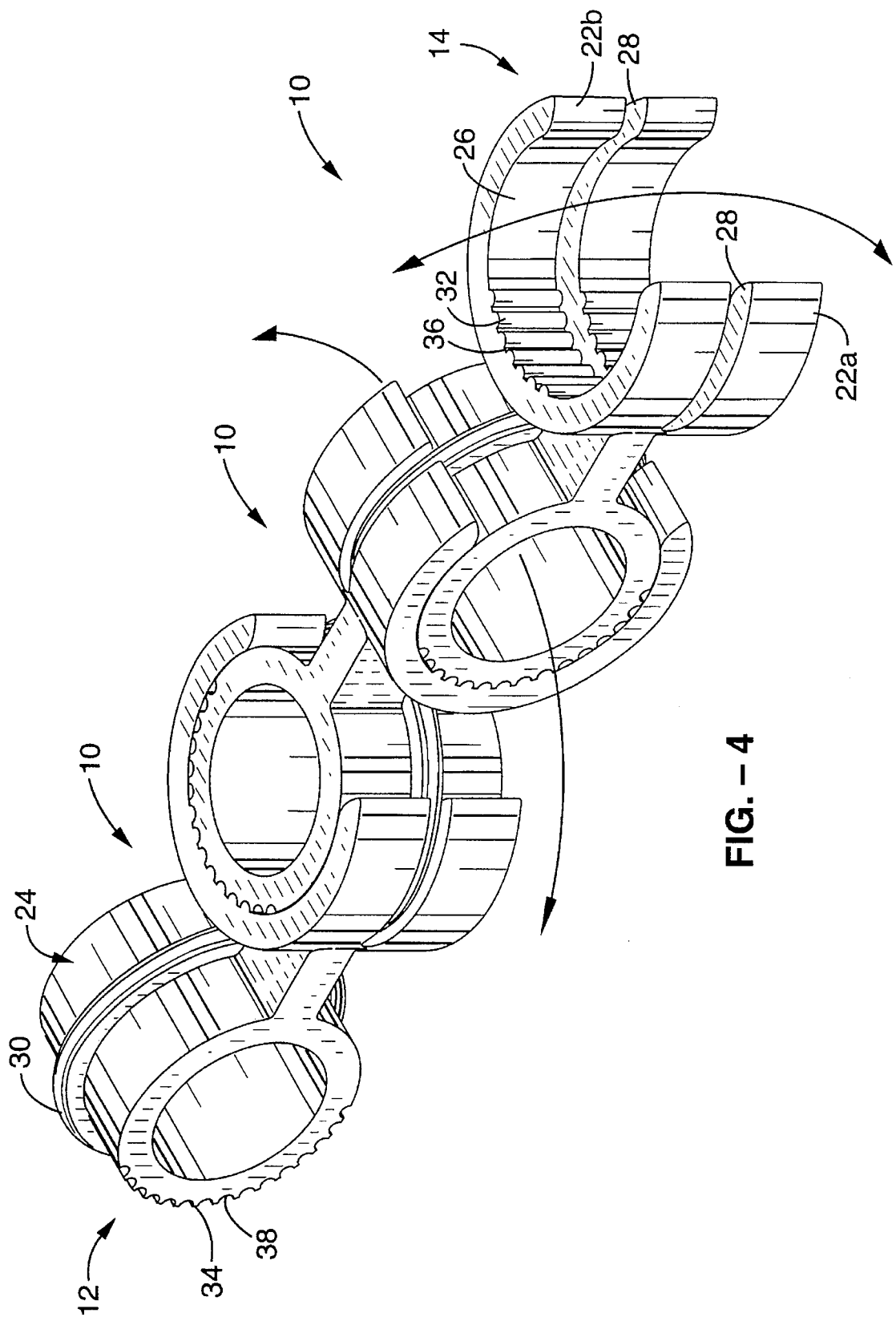
FIG. 4 is a perspective view showing an assembly of three ratchet links of FIG. 1, and diagrammatically showing articulation of two of the devices in relation to each other.
Figure 5:
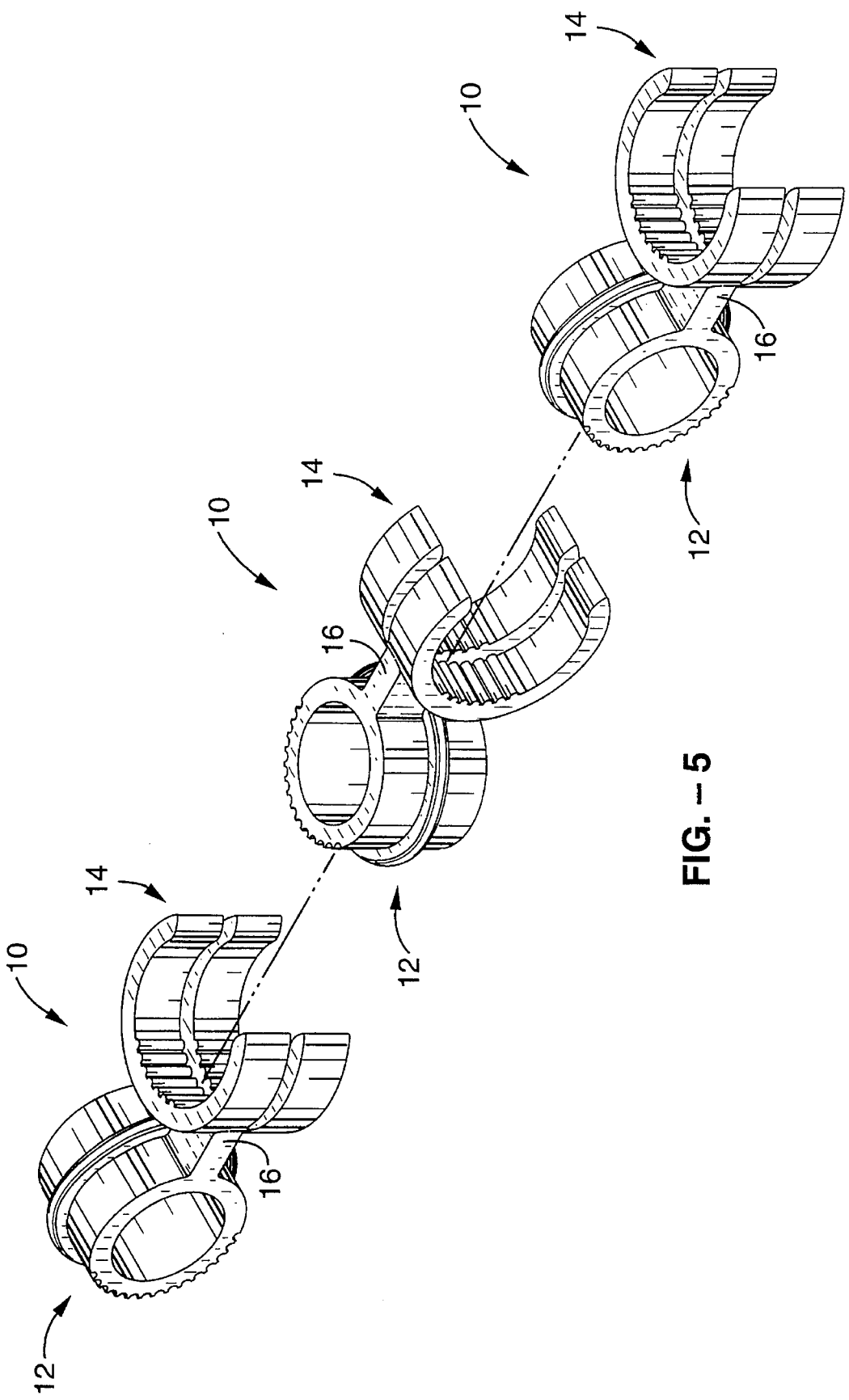
FIG. 5 is an exploded view of the assembly shown in FIG. 4.

Referring also to FIG. 4 and FIG. 5, three ratchet link devices in accordance with the present invention are shown coupled to form an articulating chain. Tongue 12 of one such device is inserted into the socket 14 of a second such device. Since prongs 22a, 22b are resilient, they move apart to receive tongue 12 upon application of suitable force. Once tongue 12 is inserted, prongs 22a, 22b will return or relax to their normal position thereby allowing tongue 12 to "pop" or snap into socket 14. Prongs 22a, 22b will then hold tongue 12 in place. Note also that, as a result of ring 30 engaging slot 28, the individual links 10 are prevented from sliding apart as a result of lateral motion while the links are engaged together. Further, in such an assembly both a tongue 12 and socket 14 remain unattached at the ends of the assembly, allowing coupling of additional devices to form an extended chain of such ratchet links.

In the coupled configurations shown in FIG. 4 and FIG. 5, the teeth 32 on the inner surface 26 of socket 14 engage and interfit with the teeth 34 on outer surface 24 of tongue 12. Articulation is achieved by applying axial force in opposite directions to the free ends of the links 10 wherein the teeth 32, 34 will disengage due to the resiliency of prongs 22a, 22b. When the force is removed, teeth 32, 34 re-engage and interfit in a new position. The articulation occurs in a ratchet fashion and can be adjusted in precise incremental amounts, with the adjusted position stable until force is re-applied. The size and spacing of the teeth can be varied to change the degree of incremental precision desired in the articulation.

Tongue 12 and socket 14 are joined by connecting bar 16 in an angularly offset configuration, such tongue 12 is generally rotated about ninety degrees relative to socket 14. By providing such an angle between tongue 12 and socket 14, a ratchet link assembly such as that shown in FIG. 4 and FIG. 5 may be formed wherein incremental adjustments may be made along multiple rotational axes, allowing both vertical and horizontal articulation. Those skilled in the art will appreciate that, by joining tongue 12 and socket 14 with different angular offsets or which provide axial alignment of tongue 12 and socket 14, additional degrees of spatial adjustment are possible. Note also from FIG. 2, that the longitudinal axis through connecting bar 16 is generally straight or aligned with the central longitudinal axis extending between each end of the device. Such an arrangement maximizes the degree of rotation of coupled links in one direction since prongs 22a, 22b will eventually abut connecting bar 16. By changing the angle of tongue 12 or socket 14 relative to connecting bar 16, the amount of travel in a particular direction can be increased or reduced by predetermined amounts.

Figure 6:
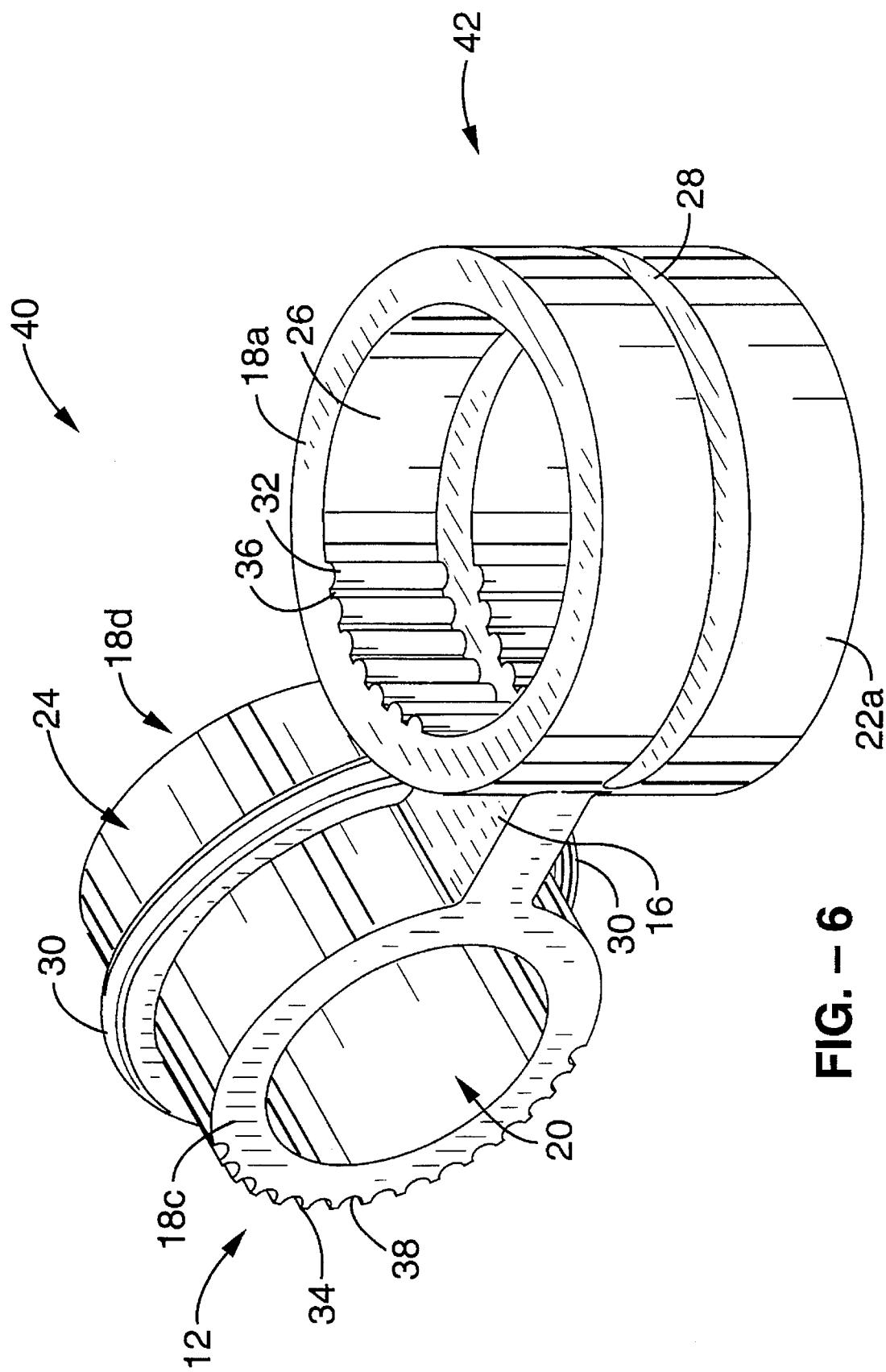
FIG. 6 is a perspective view of an alternative embodiment of the invention.

Referring now to FIG. 6, there is shown an alternative embodiment ratchet link 40 in accordance with the present invention, wherein like reference numerals denote like parts. Ratchet link 40 includes a tongue 12 and a generally circular or ring-shaped socket 42 which is coupled to tongue 12 by a connecting member 16. As with the ratchet link 10 described above, a plurality of teeth 34 are provided on the outer surface 24 of tongue 12, and are separated by a plurality of notches 38. Socket 42 includes an inner surface 26 wherein are located a plurality of teeth 32 which are separated by a plurality of notches 36. A ring 30 generally encircles tongue 12 along outer face 24, and a corresponding groove or channel 28 runs generally along the circumference of socket 42.

Ratchet link 40 differs from the ratchet link 10 described above primarily in that the individual arcuate prongs 22a, 22b of ratchet link 10 have been extended and joined together at the ends to define a ring-shaped socket 42 of generally circular structure and configuration. Socket 42 engages tongue 12 on another ratchet link device by slidably engaging tongue 12 into socket 42 from the side. In the embodiment shown in FIG. 6, ring or ridge 30 preferably is sufficiently resilient to allow socket 42 to slide over ring 30 until ring 30 can engage groove 28 in a snap fitting fashion as described above. Ring 30 may be replaced with a plurality of small protuberances to facilitate the snap fitting of tongue 12 within socket 42.

A variety of additional socket and tongue arrangements for individual ratchet links are contemplated with the invention. For example, double-socket links wherein two sockets are joined by a connecting bar, may be linked together with double tongue links, wherein two tongues are joined by a connecting bar, to form extended link assemblies. Additional arrangements of the tongue and socket related above will be suggested to persons of ordinary skill in the art, upon review of this disclosure and its parent application, Ser. No. 08/308,608, the disclosure of which is incorporated herein by reference.

Figure 7:
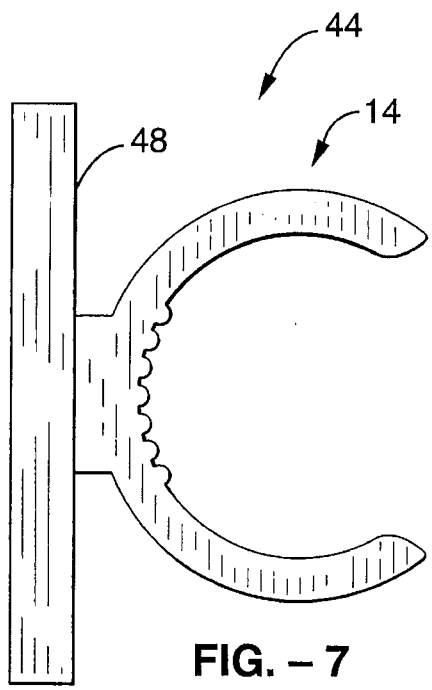
FIG. 7 is a plan view showing a tongue hook in accordance with the present invention.
Figure 8:
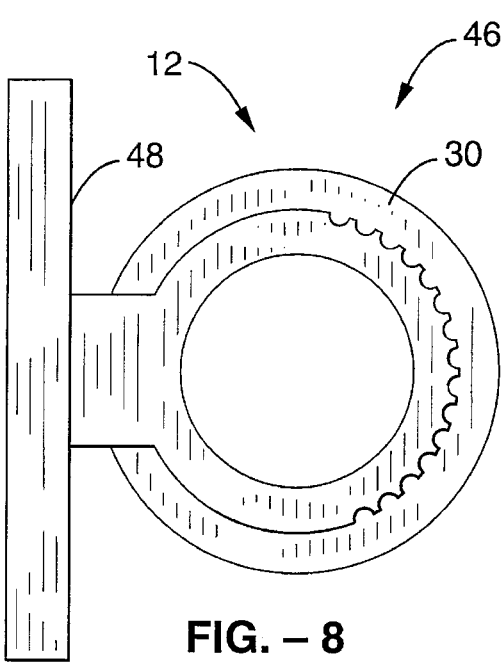
FIG. 8 is a plan view showing a socket hook in accordance with the present invention.

The present invention can be adapted to provide articulating coupling systems for coupling various items together and holding them in selected articulated positions. For example, the tongue 12 of the ratchet link 10 or ratchet link 40 described above can be associated with various means for coupling tongue 12 to objects, and the socket 14 of ratchet link 10 or socket 42 of ratchet link 40 can likewise be attached to various coupling means. Referring to FIG. 7 and FIG. 8, a socket mount 44 and a tongue mount 46 are shown wherein socket 14 is attached to a base 48 and tongue 12 is attached to a base 48 respectively. Tongue mount 46 is identical to socket mount 44 except that it includes a tongue 12 coupled to base 48 rather than a socket 14. Base 48 may be attached to a wall, shelf, head worn visor, or other object or support feature by adhesive, nails, screws, VELCRO® fasteners, or other standard attachment means used in association with base 48. Using the socket mount 44 shown in FIG. 7 together with the tongue mount 46 shown in FIG. 8, objects coupled to bases 48 on socket mount 44 and tongue mount 46 may be coupled together by engaging tongue 12 of tongue mount 46 into socket 14 of socket mount 44 in the manner described above. Alternatively, two objects can be coupled together using socket mount 44 and tongue mount 46 together with one or more intervening ratchet links 10 or 40 interposed between socket mount 44 and tongue mount 46 and linked together to form an assembly. In such an assembly, the tongue 12 of a ratchet link 10 or 40 would be engaged in socket 14 of socket mount 44, and socket 14 or 42 of ratchet links 10 or 40 respectively would be engaged by tongue 12 of tongue mount 46.

Figure 9:
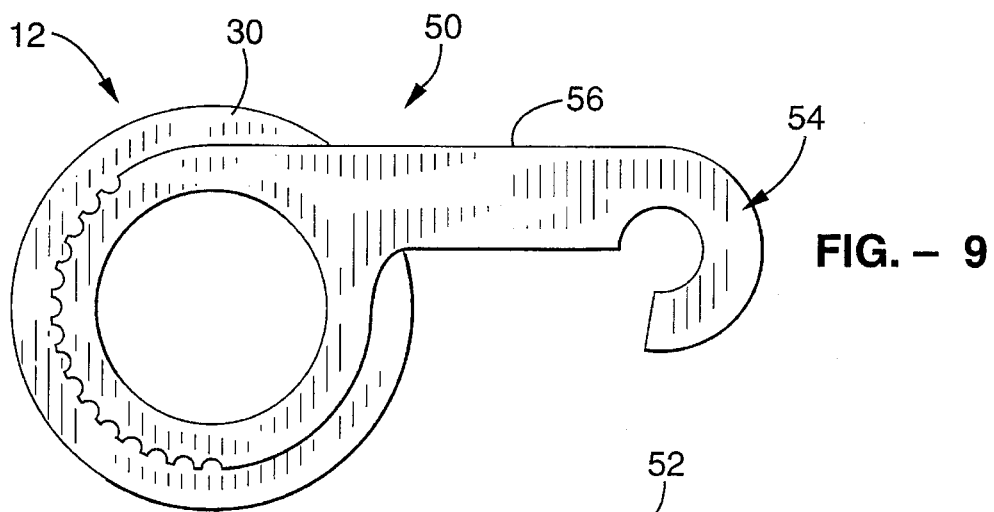
FIG. 9 is a plan view showing a socket mount in accordance with the present invention.
Figure 10:
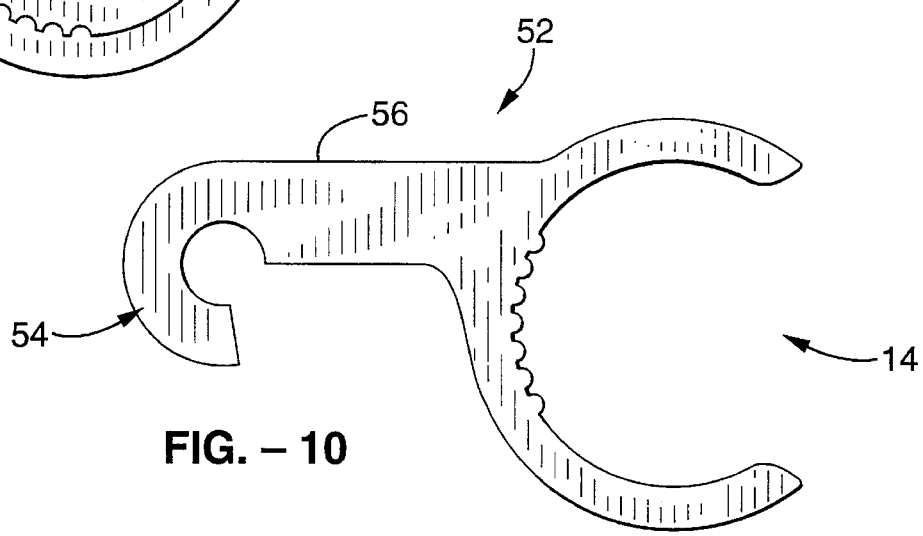
FIG. 10 is a plan view showing a tongue mount in accordance with the present invention.

Referring now to FIG. 9 and FIG. 10, coupling means in the form of hooks are shown as a tongue hook mount 50 and a socket hook mount 52, respectively. A hook 54 is joined to either a tongue 12 or a socket 14 by a connecting bar 56. Hook 54 serves as another form of coupling means, and may be coupled to a variety of objects. In this way, tongue hook 50 or socket hook 52 may be coupled to a socket mount 44 or tongue mount 48, respectively, to couple various objects together as described above. Tongue hook mount 50 and socket hook mount 52 may likewise be utilized in various combinations with the links shown in FIG. 1 and FIG. 6 to support an object or objects in a variety of positions with adjustability. It will also be appreciated that socket 14 could be of a closed ring configuration similar to socket 42 shown in FIG. 6.

Figure 11:
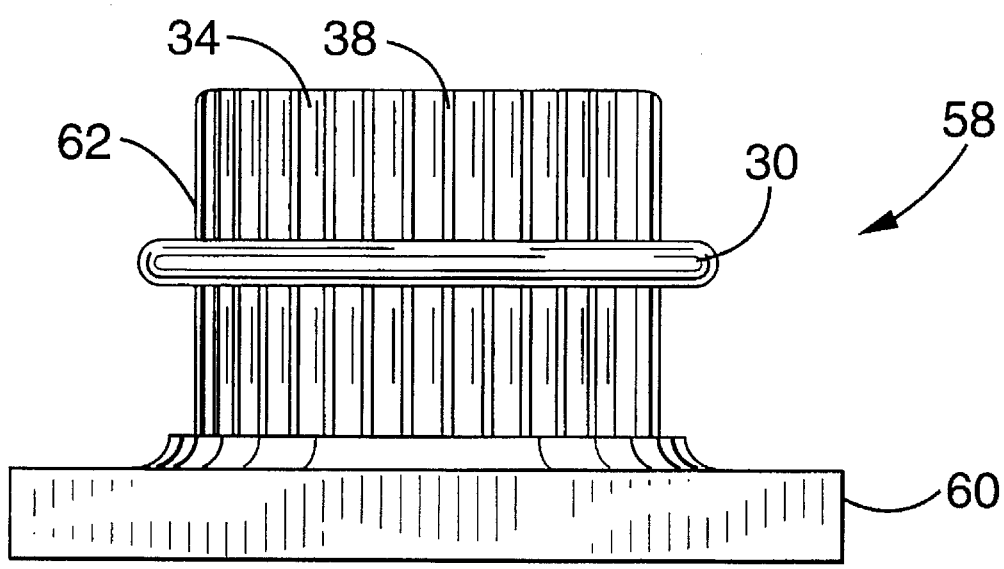
FIG. 11 is a side elevation view showing a post mount in accordance with the present invention.

Referring next to FIG. 11, a post mount 58 is shown. Post mount 58 includes a mounting base 60 which can be attached to a support using a conventional fastening means. A cylindrical post 62 attached to base 60 includes a plurality of teeth 34, notches 38 and ring 30 as are found in a tongue 12. Post 62 extends outward from mounting base 60. An open socket 14 or closed socket 42 associated with socket mount 44, socket hook 52, and/or links 10, 40 can be coupled to post mount 58 to provide for rotation about a central axis extending perpendicular to mounting base 60. Those skilled in the art will appreciate that post mount 60 could also include one or more stop means to prevent the amount of rotation in a particular direction.

The coupling means described above for use with a tongue or socket are merely exemplary, and should not be considered limiting. Numerous different coupling means may be utilized with the invention to coupled various objects together as described above. Other standard coupling means which may be used with the tongue and socket of the invention include loops, suction cups, alligator clips, snap fitting arrangements, VELCRO® fasteners, or other coupling means. It will further be appreciated that slot 28 and ring 30 can be eliminated from any of the embodiments shown, and other lateral retention means such as a cap adjacent to the faces of the coupled components and a pin extending from the cap through the center of the coupled components, could be employed if desired.

As can be seen, therefore, the present invention provides for the degree of articulation or angle of movement to be controlled easily and accurately by employing a ratchet mechanism wherein generally the link has portions sharing frictionally related surfaces which contain a plurality of serrations, ridges, bumps, or other traction generating means as in the present invention. In using the ratchet mechanism, a force is applied to the link to overcome the friction between the shared surfaces so that a certain desired position, angle, or spatial arrangement can be obtained. Once the articulating link has been adjusted to the desired position, the force is removed and the friction between the shared surfaces of the link portions retains the desired position and prevents further unwanted articulation.

One particular application of articulating links which requires facile and accurate adjustment of the links involves the head visors and head gear used in the various work occupations. The head gear worn in the medical, dental, and veterinary professions typically have face shields, protective glasses, magnifying optics, lights, reflectors, and the like suspended therefrom. Face protection in these professions has become increasingly important with the spread of AIDS. In machine shop, laboratory, and welding applications, face shields, darkened glass, and other protection means are suspended from headgear worn by workers. Similarly, bicyclists and motorcyclists attach rear-view mirrors to helmets. This suspended equipment is generally attached to the wearer's head gear by an articulating link so the wearer can adjust the position of the suspended equipment.

In many situations, however, the protection means or other equipment suspended from the head gear cannot readily be adjusted or otherwise moved into more desirable positions because the wearer's hands are otherwise engaged. Particularly, persons in the aforementioned professions and activities are frequently involved in work requiring use of head gear with equipment suspended therefrom, while at the same time both hands are fully occupied in complex, difficult, or dangerous procedures and cannot be freed to adjust or reposition the suspended equipment. Thus, there is a need in these professions for an articulating link capable of quick, facile, and accurate adjustment, so that continued readjustment by the wearer is not necessary. The present invention satisfies this need, as well as others, by providing both the head gear and the equipment to be suspended with suitable attachment means to couple with the ratchet links.

Another application of ratchet links in accordance with the present invention is for use with toy building blocks and building sets, such as LEGO® and the like. Toy building blocks and building sets are frequently used to create small (toy) buildings, ships, automobiles, and other structures. Ratchet links in accordance with the present invention could be attached to the building blocks at the projections, indentations, or other surface features on the building blocks to allow moving parts in the structures assembled from the building blocks, such as doors, windows, and the like, to be articulated in a plurality of positions.

Accordingly, it will be seen that this invention provides a ratchet link which provides for quick, easy, and accurate articulating attachment of objects. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A ratchet link, comprising:
    (a) a socket, said socket including a pair of opposing, spaced-apart, arcuate prongs, said socket including an inner surface;
    (b) a generally cylindrical tongue, said tongue joined to and extending away from said socket, said tongue including an outer surface, said tongue angularly offset from said socket; and
    (c) link coupling means for pivotally and releasably coupling said tongue to a socket on another said ratchet link and articulating said coupled ratchet links in a plurality of discrete positions, said link coupling means comprising
        (i) a first plurality of teeth extending outward from said inner surface of said socket and separated by a first plurality of notches; and
        (ii) a second plurality of teeth extending outward from said outer surface of said tongue and separated by a second plurality of notches.

2. A ratchet link as recited in claim 1, wherein said link coupling means further comprises:
    (a) a slot, said slot positioned circumferentially along said inner surface of said socket; and
    (b) a ring, said ring positioned circumferentially along said outer surface of said tongue.

3. A ratchet link as recited in claim 2, wherein said socket has a first pair of parallel faces and said tongue has a second pair of parallel faces, and wherein said first plurality of teeth extend between said first pair of parallel faces and said second plurality of teeth extend between said second pair of parallel faces.

4. A ratchet link as recited in claim 2, wherein said first pair of faces are substantially perpendicular to said second pair of faces.

5. A ratchet link as recited in claim 1, wherein said tongue includes a coaxial opening extending between said first pair of parallel faces.

6. A ratchet link as recited in claim 1, wherein said tongue is angularly offset from said socket by an angle of approximately ninety degrees.

7. A ratchet link as recited in claim 1, wherein said prongs are joined together to provide a circular structure and configuration to said socket.

8. A ratchet link, comprising:
    (a) a socket, said socket including a pair of opposing, spaced-apart, resilient arcuate prongs, said prongs having ends, said socket having an inner surface between said ends of said prongs;
    (b) a slot, said slot positioned circumferentially along said inner surface of said socket between said ends of said prongs;
    (c) a first plurality of teeth extending outward from said inner surface of said socket and separated by a first plurality of notches;
    (d) a generally cylindrical tongue, said tongue joined to and extending away from said socket, said tongue angularly offset relative to said socket, said tongue having an outer surface;
    (e) a ring, said ring positioned circumferentially along said outer surface of said tongue; and
    (f) a second plurality of teeth extending outward from said outer surface of said tongue and separated by a second plurality of notches.

9. A ratchet link as recited in claim 8, wherein said tongue is configured and structured to pivotally and releasably engage a socket on another said ratchet link, wherein said slot of another said ratchet link receives said ring of said tongue and wherein said teeth and notches in said tongue intermesh with said teeth and notches in said socket of said other ratchet link.

10. A ratchet link as recited in claim 8, wherein said socket has a first pair of parallel faces and said tongue has a second pair of parallel faces, and wherein said first plurality of teeth extend between said first pair of parallel faces and said second plurality of teeth extend between said second pair of parallel faces.

11. A ratchet link as recited in claim 10, wherein said first pair of parallel faces are substantially perpendicular to said second pair of parallel faces.

12. A ratchet link as recited in claim 8, wherein said tongue includes a coaxial opening extending between said first pair of faces.

13. A ratchet link as recited in claim 8, wherein said tongue is angularly offset from said socket by an angle of approximately ninety degrees.

14. A ratchet link as recited in claim 8, wherein said ends of said prongs are joined together to provide a circular structure and configuration to said socket.

15. A ratchet link, comprising:
    (a) a socket, said socket including a pair of opposing, spaced-apart, resilient arcuate prongs, said prongs having ends, said socket having an inner surface between said ends of said prongs, said socket having a first pair of parallel faces;
    (b) a slot, said slot positioned circumferentially along said inner surface of said socket between said ends of said prongs;
    (c) a first plurality of teeth extending outward from said inner surface of said socket and separated by a first plurality of notches, said first plurality of teeth extending between said first pair of parallel faces;
    (d) a generally cylindrical tongue, said tongue joined to and extending away from said socket, said tongue angularly offset relative to said socket, said tongue having an outer surface;

(e) a ring, said ring positioned circumferentially along said outer surface of said tongue, said tongue having a second pair of parallel faces; and (f) a second plurality of teeth extending outward from said outer surface of said tongue and separated by a second plurality of notches, said second plurality of teeth extending between said second pair of parallel faces.

16. A ratchet link as recited in claim 15, wherein said tongue is configured and structured to pivotally and releasably engage a socket on another said ratchet link, wherein said slot of another said ratchet link receives said ring of said tongue and wherein said teeth and notches in said tongue intermesh with said teeth and notches in said socket of said other ratchet link.

17. A ratchet link as recited in claim 15, wherein said tongue includes a coaxial opening extending between said second pair of parallel faces.

18. A ratchet link as recited in claim 15, wherein said tongue is angularly offset from said socket by an angle of approximately ninety degrees.

19. A ratchet link as recited in claim 15, wherein said first pair of faces are substantially perpendicular to said second pair of faces.

20. A ratchet link as recited in claim 15, wherein said ends of said prongs are joined together to provide a circular structure and configuration to said socket.

21. An articulating coupling system, comprising:

(a) a socket, said socket including a pair of opposing, spaced-apart, resilient arcuate prongs, said prongs having ends, said socket having an inner surface between said ends of said prongs, said socket including a plurality of teeth extending outward from said inner surface of said socket and separated by a first plurality of notches;

(b) a generally cylindrical tongue, said tongue having an outer surface, said tongue including a plurality of teeth extending outward from said outer surface of said tongue and separated by a second plurality of notches;

(c) means for coupling said socket to an object; and (d) means for coupling said tongue to an object.

22. An articulating coupling system as recited in claim 21, further comprising (a) a slot, said slot positioned circumferentially along said inner surface of said socket; and (b) a ring, said ring positioned circumferentially along said outer surface of said tongue.

23. An articulating coupling system as recited in claim 21, wherein said ends of said prongs are joined together to provide a circular structure and configuration to said socket.

* * * * *